(12) United States Patent
Minato et al.

(10) Patent No.: US 9,672,628 B2
(45) Date of Patent: Jun. 6, 2017

(54) METHOD FOR PARTITIONING AREA, AND INSPECTION DEVICE

(71) Applicant: OMRON Corporation, Kyoto-shi, Kyoto (JP)

(72) Inventors: Yoshihisa Minato, Kyoto (JP); Yukiko Yanagawa, Nara (JP); Yasuyuki Ikeda, Shiga (JP); Yutaka Kiuchi, Shiga (JP); Yutaka Kato, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 14/781,075

(22) PCT Filed: Feb. 25, 2014

(86) PCT No.: PCT/JP2014/054462
§ 371 (c)(1),
(2) Date: Sep. 29, 2015

(87) PCT Pub. No.: WO2014/156425
PCT Pub. Date: Oct. 2, 2014

(65) Prior Publication Data
US 2016/0300358 A1    Oct. 13, 2016

(30) Foreign Application Priority Data
Mar. 29, 2013 (JP) ................. 2013-073545

(51) Int. Cl.
*G06K 9/34*     (2006.01)
*G06T 7/00*     (2017.01)
(Continued)

(52) U.S. Cl.
CPC ............ *G06T 7/0081* (2013.01); *G06K 9/34* (2013.01); *G06K 9/4652* (2013.01); *G06T 7/11* (2017.01);
(Continued)

(58) Field of Classification Search
CPC ................. G06T 7/0081; G06T 2207/20144
See application file for complete search history.

(56) References Cited

U.S. PATENT DOCUMENTS 5,883,971 A * 3/1999 Bolle ................. G06K 9/00067
382/115
2008/0247619 A1  10/2008 Li
(Continued)

FOREIGN PATENT DOCUMENTS

JP    2007-052466 A    3/2007
JP    2007-193553 A    8/2007
(Continued)

OTHER PUBLICATIONS

International Search Report issued in corresponding application No. PCT/JP2014/054462 mailed Apr. 8, 2014 (2 pages).
(Continued)

*Primary Examiner* — Eueng-Nan Yeh
(74) *Attorney, Agent, or Firm* — Osha Liang LLP

(57) ABSTRACT

An area partitioning method for partitioning an image into a foreground and a background includes a foreground designation step of causing a user to designate a part of pixels in an area that should be the foreground in the image as a foreground designating pixel, an estimation step of estimating a foreground color distribution and a background color distribution based on a color of the foreground designating pixel designated by the user, and an area partition step of partitioning the image into a foreground area and a background area with the estimated foreground color distribution and the estimated background color distribution as a condition. The estimation step includes dividing the color distribution of the image into a plurality of clusters, and selecting at least one cluster having a large relationship with
(Continued)

the foreground designating pixel designated by the user in the plurality of clusters as the foreground color distribution.

26 Claims, 7 Drawing Sheets

(51) Int. Cl.
  *G06K 9/46* (2006.01)
  *G06T 7/11* (2017.01)
  *G06T 7/194* (2017.01)
  *G06T 7/136* (2017.01)

(52) U.S. Cl.
  CPC .............. *G06T 7/136* (2017.01); *G06T 7/194* (2017.01); *G06K 2209/19* (2013.01); *G06T 2200/24* (2013.01); *G06T 2207/10016* (2013.01); *G06T 2207/10024* (2013.01); *G06T 2207/20076* (2013.01); *G06T 2207/20081* (2013.01); *G06T 2207/20101* (2013.01); *G06T 2207/20104* (2013.01); *G06T 2207/30196* (2013.01); *G06T 2207/30201* (2013.01)

(56) References Cited

U.S. PATENT DOCUMENTS

| | | | | |
|---|---|---|---|---|
| 2009/0116732 | A1* | 5/2009 | Zhou | H04N 13/0029 382/154 |
| 2009/0231469 | A1 | 9/2009 | Kato | |
| 2011/0164814 | A1 | 7/2011 | Onai et al. | |
| 2013/0170742 | A1* | 7/2013 | Dai | G06T 7/0079 382/164 |
| 2014/0205206 | A1* | 7/2014 | Datar | G06T 3/0012 382/298 |

FOREIGN PATENT DOCUMENTS

| | | |
|---|---|---|
| JP | 2008-245719 A | 10/2008 |
| JP | 2010-028608 A | 2/2010 |
| JP | 2010-039999 A | 2/2010 |
| JP | 2010-079477 A | 4/2010 |
| JP | 2012-200025 A | 10/2012 |

OTHER PUBLICATIONS

Yuri Y. Boykov et al.; "Interactive Graph Cuts for Optimal Boundary & Region Segmentation of Objects in N-D Images"; Proceedings of "Internation Conference on Computer Vision", Vancouver, Canada, vol. 1, pp. 105-112; Jul. 2001 (8 pages).

Yin Li et al.; "Lazy Snapping, ACM Transactions on Graphics"; Proceedings of ACM Siggraph 2004; vol. 23, No. 3, pp. 303-308; Aug. 2004 (6 pages).

Extended European Search Report in counterpart European Application No. 14 77 5567.2 issued Oct. 28, 2016 (8 pages).

D. Chen et al; "Improved GrabCut Segmentation via GMM Optimisation", Computing: Techniques and Applications, '08 Digital Image, pp. 39-45; Dec. 2008 (7 pages).

C. Rother et al; "GrabCut"; ACM Transactions on Graphics, vol. 23, No. 3, p. 309; Aug. 2004 (6 pages).

Office Action in counterpart Japanese Patent Application No. 2013-073545 issued Oct. 4, 2016 (8 pages).

First Office Action issued in corresponding Chinese Application No. 201480018765.6, mailed on Feb. 21, 2017 (22 pages).

Han Shoudong; "The texture build pattern with the picture segmentation optimize the method analysis"; Chinese loctorate thesis full-text database Information Technology, 1138-89; pp. 42-44; Aug. 15, 2011 (4 pages).

* cited by examiner

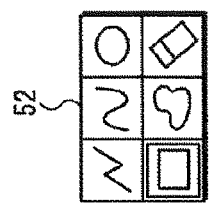
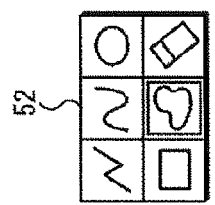
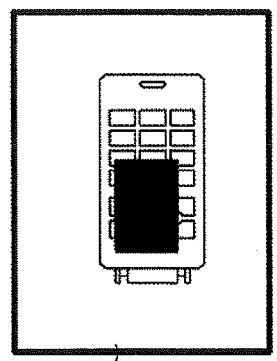
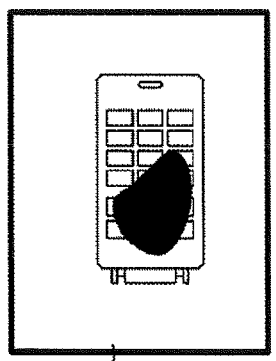
Fig. 6(d)
Fig. 6(e)
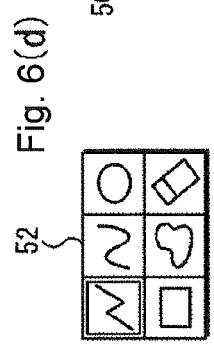
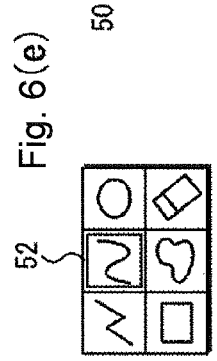
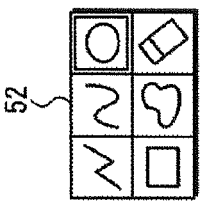
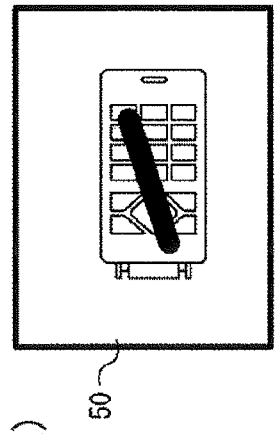
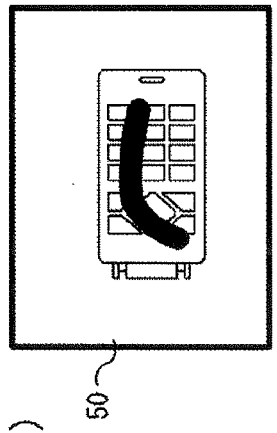
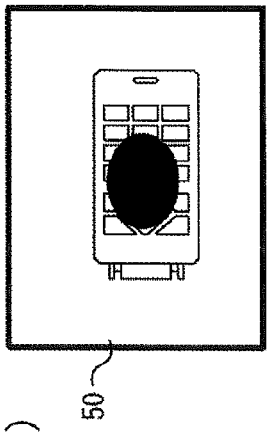
Fig. 6(a)
Fig. 6(b)
Fig. 6(c)

METHOD FOR PARTITIONING AREA, AND INSPECTION DEVICE

BACKGROUND

Technical Field

The present invention relates to a technology of extracting a desired area from an image.

Related Art

There is a well-known technology called area partition (segmentation) on which a given image is separated into a foreground (portion to be extracted) and a background (other portions) through digital image processing using a computer. Conventionally, various area partitioning algorithms are proposed. The area partitioning algorithm is roughly divided into a pixel-based method for determining a foreground or a background in each pixel and a contour-based method for searching a boundary between the foreground and the background. Examples of the former include simple binarization or color gamut extraction and color division by clustering. PTL 1 proposes a method for finely distinguishing between the pixel of a target color (such as a human skin color) and the pixels of other colors by further clustering a pixel group obtained by color gamut extraction. Examples of the latter include snake, level set, and graph cut (for example, see NPL 1). In these methods, an optimum solution of a contour (the boundary between the foreground and the background) of a foreground area is solved as an energy minimization problem.

In the area partitioning method, in order to simplify the algorithm and improve partition accuracy, frequently a user instructs a representative color of each of the foreground and the background (called interactive segmentation). For example, NPL 1 discloses a method in which, when the user draws a line in a part of each of the foreground and the background of the display image, the representative colors of the foreground and the background are sampled from the line.

The interactive segmentation is very useful for such a case that it is difficult to automatically divide the foreground and the background. Examples of the case include the case that the color of the foreground or the background is unknown, the case that many colors and patterns are included in the image, and the case that the color of the foreground is similar to that of the background. However, depending on the user, possibly the user feels that work to designate both the foreground and the background is troublesome, or it takes time for the user to search the appropriate background. It is intuitive as a feeling of a general human to designate a part of the interesting object (foreground). On the other hand, a manipulation to designate the uninteresting area (background) is not intuitive, but many users feel an uncomfortable feeling.

PTL 2 proposes a method for simplifying designation work of the user. In the method, a size (a range that can be present) of the object is previously set as prior knowledge, a point (background) existing outside the object is estimated from a coordinate of the point and the size of the object to extract the colors of the foreground and the background when the user designates one point of the object (foreground). However, the method can hardly be applied to the case that the size of the object is unknown, and the method lacks versatility.

In an "automatic selection tool" and a "quick selection tool" mounted on photo-retouch software "Photoshop" (product of Adobe Systems Incorporated), when the user designates a part of the image, the similar color pixel located around the designated place is automatically selected. That is, the area can be extracted only by designating a part of the foreground, and the work to designate the background is eliminated. However, because only a similarity with the color (the representative color of the foreground) of the designated place is evaluated in the software, accuracy of an extraction result is not too high. For example, in the case that the color of the foreground is similar to that of the background, or in the case that a change in color of the foreground portion is gently continued, the range intended by the user is not selected, but correction work such as addition or deletion of range is required.

CITATION LIST

Patent Literature

PTL 1: Japanese Unexamined Patent Publication No. 2007-193553
PTL 2: Japanese Unexamined Patent Publication No. 2008-245719

Non Patent Literature

NPL 1: Y. Boykov and M. P. Jolly, "Interactive Graph Cuts for Optimal Boundary & Region Segmentation of Objects in N-D images", ICCV2001, 01, p. 105 (2001)

SUMMARY

One or more embodiments of the present invention is able to accurately partition the image into the foreground and the background only by the user's instruction of a part of the foreground.

In one or more embodiments of the present invention, foreground and background color distributions are estimated based on a color of a foreground designating pixel designated by a user, and area partition is performed with the foreground and background color distributions as a condition.

Specifically, according to one or more embodiments of the present invention, an area partitioning method for partitioning an image into a foreground and a background, the method includes: a foreground designation step in which a computer causes a user to designate a part of pixels in an area that should be the foreground in the image as a foreground designating pixel; an estimation step in which the computer estimates a foreground color distribution and a background color distribution based on a color of the foreground designating pixel designated by the user; and an area partition step in which the computer partitions the image into a foreground area and a background area with the estimated foreground color distribution and the estimated background color distribution as a condition. At this point, the estimation step includes: a step of dividing the color distribution of the image into plural clusters; and a step of selecting at least one cluster having a large relationship with the foreground designating pixel designated by the user in the plural clusters as the foreground color distribution, and of selecting at least one cluster having a small relationship with the foreground designating pixel as the background color distribution.

In the configuration, because the user designates only a part of the foreground (the user needs not to designate the background), the user intuitively and simply performs the manipulation. The foreground and background color distributions are estimated based on the color of the foreground designating pixel designated by the user, and the area partition is performed with the foreground and background color distributions as the condition, so that the area partition can be performed with higher accuracy compared with the method in which only the condition of the foreground is used. Because the prior knowledge such as the size of the object (foreground) needs not to be provided, there is an advantage of excellent versatility.

According to one or more embodiments of the present invention, in the area partition step, an optimum solution of the foreground area is obtained from plural candidate areas that are of candidate solutions of the foreground area by evaluating identity of the foreground of a color of each pixel inside the candidate area for the foreground color distribution and identity of the background of a color of each pixel outside the candidate area for the background color distribution with respect to the plural candidate areas. The accurate area partition can be performed by the optimum solution search.

According to one or more embodiments of the present invention, in the area partition step, the plural candidate areas are set so as to include the foreground designating pixel designated by the user. A search range can be narrowed with not only the information on the color of the foreground designating pixel designated by the user but also the positional information as the initial condition. Therefore, improved accuracy of the optimum solution search and shortened processing time can be expected.

According to one or more embodiments of the present invention, in the estimation step, magnitude of relationship with the foreground designating pixel is evaluated with respect to each of the plural cluster based on a count result of the foreground designating pixel included in the cluster. In counting the foreground designating pixel included in the cluster, the number of foreground designating pixels may directly be counted, or the count may be performed while a weight is provided according to a position of the foreground designating pixel.

According to one or more embodiments of the present invention, in the estimation step, the cluster in which the relationship with the foreground designating pixel is greater than or equal to a threshold is selected as the foreground color distribution, or a predetermined number of clusters having the large relationship with the foreground designating pixel is selected in descending order as the foreground color distribution. According to one or more embodiments of the present invention, in the estimation step, the cluster having no foreground designating pixels or the cluster in which the relationship with the foreground designating pixel is less than the threshold is selected as the background color distribution, or a predetermined number of clusters having the small relationship with the foreground designating pixel is selected in ascending order as the background color distribution. At this point, any value of 1 or more may be taken as the threshold or the predetermined number, and the value may be changed by the user or dynamically changed by a computer.

According to one or more embodiments of the present invention, in the foreground step, the foreground designating pixel is designated by a manipulation to draw a graphic on the image displayed on a display device. The use of the user interface can intuitively and simply designate the foreground designating pixel. At this point, the graphic may be drawn in any format. Examples of the graphics include a straight line, a curve, a circle, an ellipse, a polygon, and a closed graphic.

An area partitioning method according to one or more embodiments of the present invention comprises at least one of the pieces of processing, or comprehended as an area partitioning device or an image processing device including at least one of the pieces of processing (functions). In an inspection device or an inspection method according to one or more embodiments of the present invention, the foreground area extracted through the processing is set to the inspection area and the inspection object is inspected by analyzing the image in the inspection area. A program according to one or more embodiments of the present invention causes computer to execute each step of an area partitioning method according to one or more embodiments of the present invention or an inspection method according to one or more embodiments of the present invention. A recording medium according to one or more embodiments of the present invention has a program according to one or more embodiments of the present invention recorded thereon. The scope of the present invention includes any combination of the pieces of processing and functions as long as technical inconsistency is not generated.

In one or more embodiments of the present invention, only the user partially instructs the foreground, which allows the image to be accurately partitioned into the foreground and the background.

BRIEF DESCRIPTION OF THE DRAWINGS

FIGS. 6(a)-6(e) are views illustrating a drawing example of a foreground designating graphic.

DETAILED DESCRIPTION

Embodiments of the present invention will be described below with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In one or more embodiments of the present invention, only the user partially designates a foreground to estimate color distributions of both the foreground and a background, and area partition is accurately performed with the color distributions as a condition in interactive segmentation that requires an instruction of a user. The area partitioning method according to one or more embodiments of the present invention can be used as an elemental technology for various pieces of digital image processing, computer vision, and machine vision. Examples of applications include processing of extracting the area that should be an inspection target from an original image in an image inspection device, processing of detecting the area or contour of a face, a human body, or a hand finger (gesture) from a still image or a moving image, processing of detecting a white line or a sign of a road or a predetermined physical body from a video image of a car-mounted camera, processing of setting the area of an input target in constructing an image processing learning database, processing of trimming only a foreground portion from the original image in performing a background combination of image editing, and processing of extracting only an organ or a region of a diagnostic target from a medical image. An application example in which the area partitioning method according to one or more embodiments of the present invention is mounted on an inspection area setting function (setting tool) of the image inspection device will be described below.

(Image Inspection Device)

Figure 1:
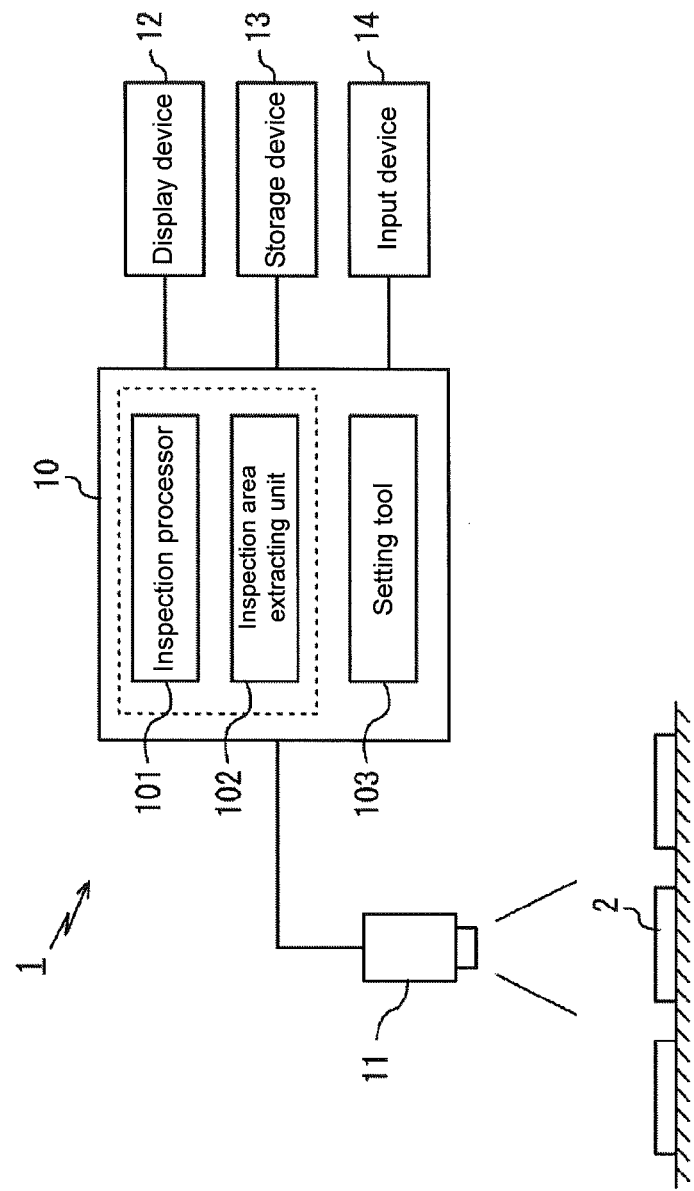
FIG. 1 is a view schematically illustrating a configuration of an image inspection device.

FIG. 1 schematically illustrates a configuration of an image inspection device. An image inspection device 1 performs an appearance inspection of an inspection object 2 conveyed on a conveying passage.

As illustrated in FIG. 1, the image inspection device 1 is constructed with hardware such as a device body 10, an image sensor 11, a display device 12, a storage device 13, and an input device 14. The image sensor 11 captures a color or monochrome still image or moving image in the device body 10. For example, a digital camera can suitably be used as the image sensor 11. However, when a special image (such as an X-ray image and a thermo image) except for a visible-light image is used in the inspection, a sensor suitable for the image may be used. The display device 12 displays the image captured in the image sensor 11, an inspection result, and a GUI screen associated with inspection processing or setting processing. For example, a liquid crystal display can be used as the display device 12. The storage device 13 stores various pieces of setting information (such as inspection area definition information and inspection logic) referred to by the image inspection device 1 in the inspection processing or the inspection result. For example, an HDD, an SSD, a flash memory, and a network storage can be used as the storage device 13. The input device 14 is manipulated by the user in order to input an instruction to the device body 10. For example, a mouse, a keyboard, a touch panel, and a dedicated console can be used as the input device 14.

The device body 10 can be constructed with a computer including a CPU (Central Processing Unit), a main storage device (RAM), and an auxiliary storage device (such as a ROM, an HDD, and an SSD) as hardware. The device body 10 includes an inspection processor 101, an inspection area extracting unit 102, and a setting tool 103 as a function. The inspection processor 101 and the inspection area extracting unit 102 are the function associated with the inspection processing, and the setting tool 103 is the function of supporting user's work to set setting information necessary for the inspection processing. A computer program stored in the auxiliary storage device or the storage device 13 is loaded on the main storage device and executed by the CPU, thereby implementing the functions. FIG. 1 illustrates only one example of the device configuration, and the image sensor 11, the display device 12, the storage device 13, and the input device 14 may partially or fully be integrated with the device body 10. The device body 10 may be constructed with a computer such as a personal computer and a slate device, a dedicated chip, or an on-board computer.

(Inspection Processing)

Figure 2:
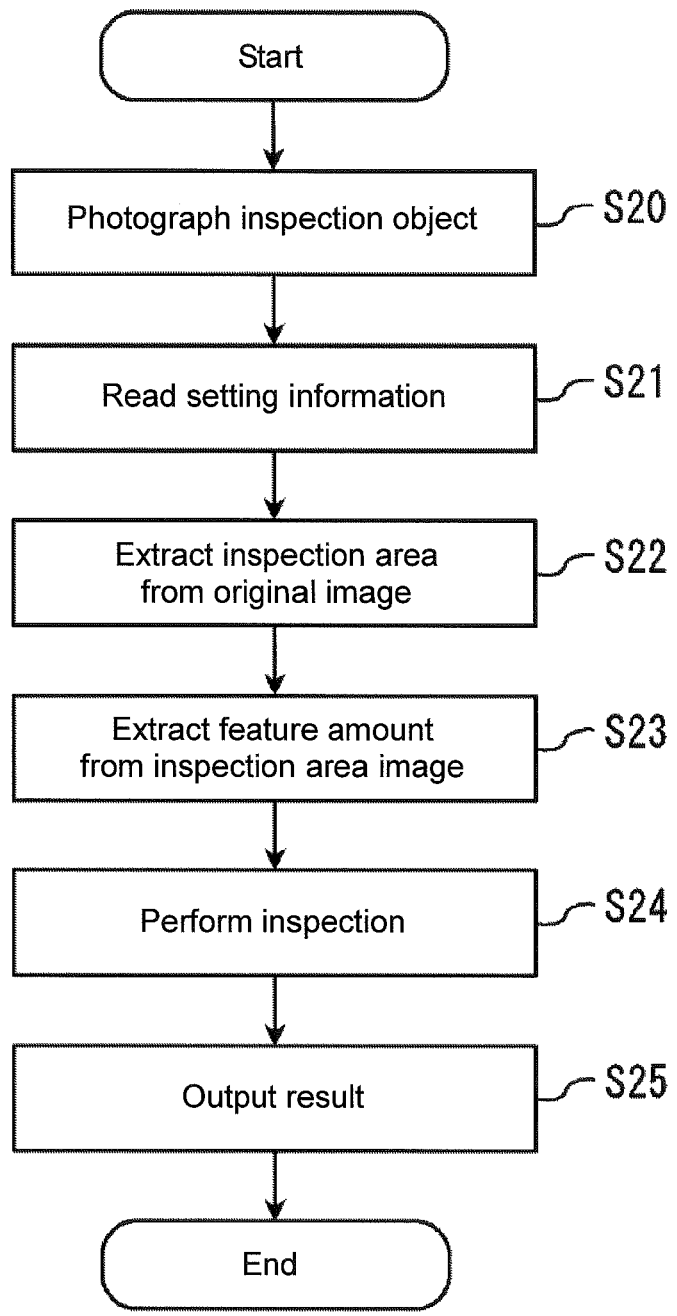
FIG. 2 is a flowchart illustrating a flow of inspection processing.
Figure 3:
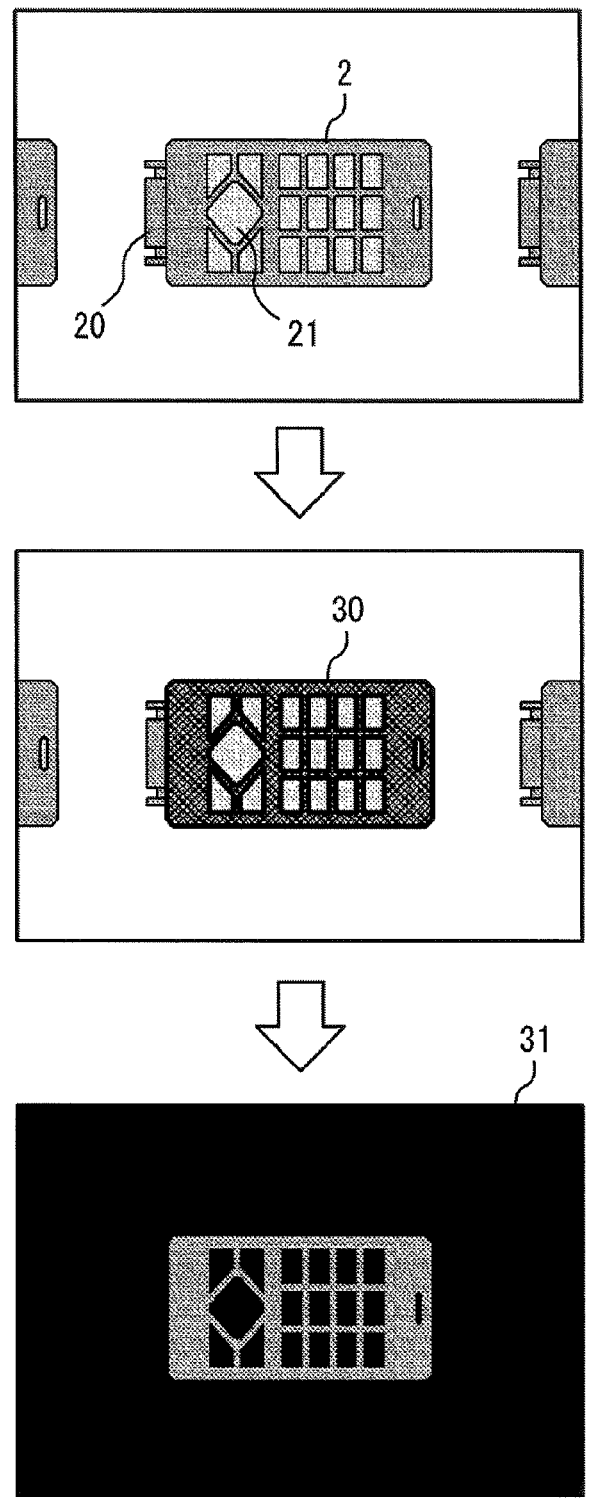
FIG. 3 is a view illustrating a process of extracting an inspection area in the inspection processing.

An operation associated with the inspection processing of the image inspection device 1 will be described with reference to FIGS. 2 and 3. FIG. 2 is a flowchart illustrating a flow of the inspection processing, and FIG. 3 is a view illustrating the inspection area extracting process in the inspection processing. The flow of the inspection processing will be described with the inspection (detection of a scratch and color unevenness) for a panel surface of a chassis component of a mobile phone as an example for convenience.

In Step S20, the image sensor 11 photographs the inspection object 2, and image data is captured in the device body 10. As needed basis, the captured image (original image) is displayed on the display device 12. An upper stage of FIG. 3 illustrates an example of the original image. The chassis component 2 that is of an inspection target is photographed in a center of the original image, and chassis components located adjacent to the chassis component 2 on a conveying passage are partially photographed on both sides of the chassis component 2.

In Step S21, the inspection area extracting unit 102 reads the necessary setting information from the storage device 13. The setting information includes at least the inspection area definition information and the inspection logic. The inspection area definition information means one that defines a position and a shape of an inspection area to be extracted from the original image. Any format may be used in the inspection area definition information. For example, a bit mask in which a label is changed on an inside and an outside of the inspection area and vector data in which a contour of the inspection area is expressed by a Bezier curve or a spline curve can be used as the inspection area definition information. The inspection logic means information defining a content of the inspection processing. Examples of the inspection logic include a kind of a feature amount used in the inspection, a determination method, and parameters and thresholds used in feature amount extraction processing and determination processing.

In Step S22, according to the inspection area definition information, the inspection area extracting unit 102 extracts a portion of the inspection area from the original image. A middle stage of FIG. 3 illustrates a state in which an inspection area (indicated by cross-hatching) 30 defined by the inspection area definition information is overlapped on the original image. It is found that the inspection area 30 is just overlapped on the panel surface of the chassis component 2. A lower stage of FIG. 3 illustrates a state in which an image (inspection area image 31) in the inspection area 30 is extracted from the original image. The conveyance passage and adjacent components, which are photographed around the chassis component 2, are deleted in the inspection area image 31. A hinge portion 20 and a button portion 21, which are also excluded from a target region of the surface inspection, are also deleted. The obtained inspection area image 31 is transferred to the inspection processor 101.

In Step S23, according to the inspection logic, the inspection processor 101 analyzes the inspection area image 31 to extract the necessary feature amount. In one or more embodiments of the present invention, a color of each pixel of the inspection area image 31 and an average value of the color are extracted as the feature amount used to inspect the scratch or the color unevenness in the surface.

In Step S24, the inspection processor 101 determines existence or non-existence of the scratch or the color unevenness according to the inspection logic. For example, in the case that a pixel group in which a color difference exceeds the threshold with respect to the average value obtained in Step S23 is detected, the pixel group can be determined to be the scratch or color unevenness.

In Step S25, the inspection processor 101 displays the inspection result on the display device 12, and stores the inspection result in the storage device 13. Thus, the inspection processing is completed with respect to the one inspection object 2. In a production line, the pieces of processing in Steps S20 to S25 of FIG. 2 are repeated in synchronization with the time the inspection object 2 is conveyed in an angle of view of the image sensor 11.

In the appearance inspection, desirably only the pixels that should be the inspection target are cut out as the inspection area image 31 in just proportions. When the background portion or the unnecessary portion (in the example of FIG. 3, the hinge portion 20 and the button portion 21) is included in the inspection area image 31, possibly the pixels of the background portion or the unnecessary portion constitute a noise to degrade inspection accuracy. On the other hand, when the inspection area image 31 is smaller than a range that should be the inspection target, possibly omission of the inspection is generated. Therefore, in the image inspection device 1 of one or more embodiments of the present invention, the setting tool 103 is prepared in order to simply produce the inspection area definition information for cutting the correct inspection area image.

(Inspection Area Setting Processing)

Figure 4:
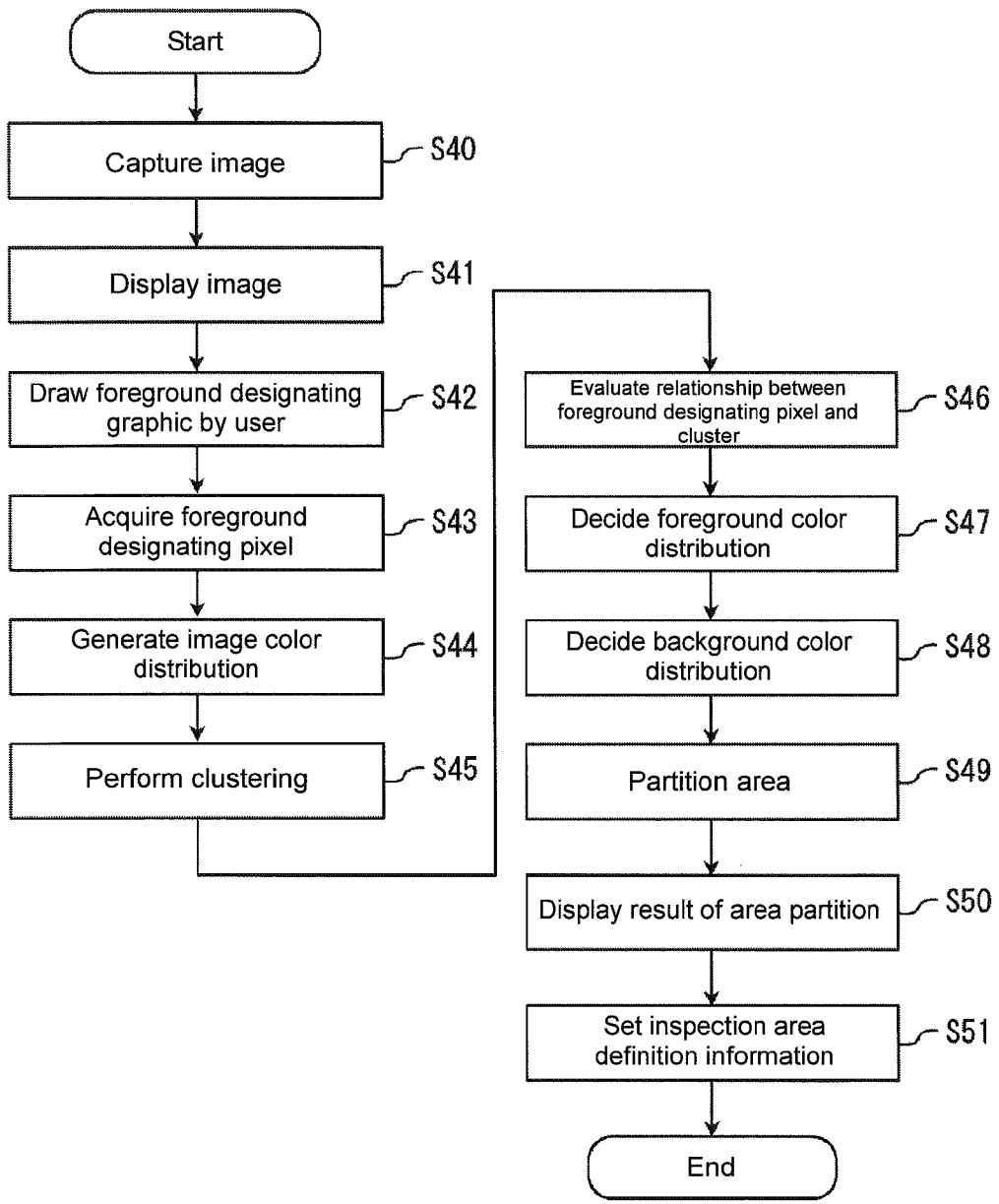
FIG. 4 is a flowchart illustrating a flow of processing of setting the inspection area using a setting tool 103.

The function and operation of the setting tool 103 will be described with reference to a flowchart in FIG. 4. FIG. 4 is a flowchart illustrating a flow of processing of setting the inspection area using the setting tool 103. An inspection area setting screen example in FIG. 5 is also referred to as appropriate.

Figure 5:
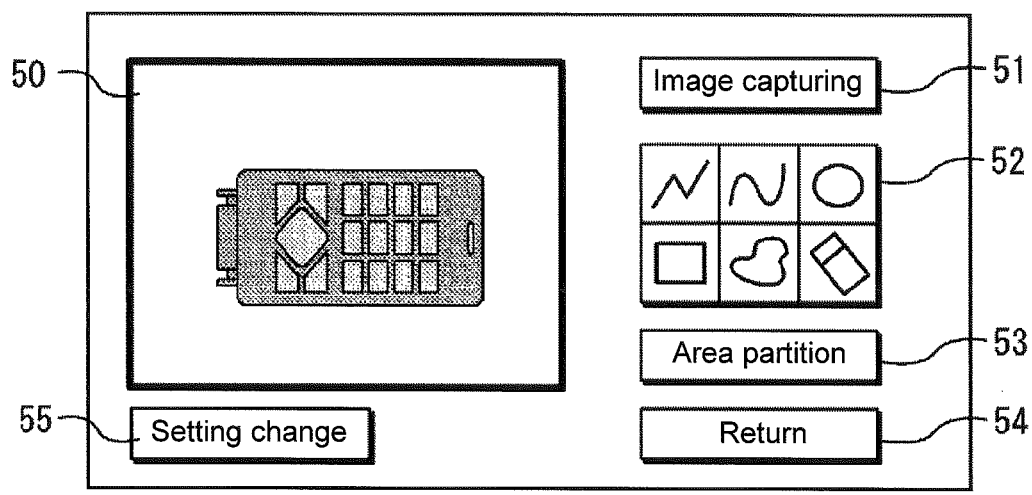
FIG. 5 is a view illustrating an example of an inspection area setting screen.

When the setting tool 103 is started, the setting screen in FIG. 5 is displayed on the display device 12. An image window 50, an image capturing button 51, a tool button 52, an area partitioning button 53, an enter button 54, and a setting change button 55 are provided in the setting screen. Selection of each button and graphic drawing (foreground designation) on the image displayed in the image window 50 can be performed by a predetermined manipulation (such as a click or drag of the mouse and press of a predetermined key) using the input device 14. The setting screen illustrated in FIG. 5 is only an example, and any UI may be used as long as the following input manipulation or image confirmation can be performed.

When the user presses the image capturing button 51, the setting tool 103 photographs a sample of the inspection object using the image sensor 11 (Step S40). The non-defective inspection object is used as the sample, and the photographing may be performed in the same state (such as relative positions of the image sensor 11 and the sample and lighting) as the actual inspection processing. The obtained sample image data is captured in the device body 10. In the case that the previously-photographed sample image exists in the auxiliary storage device of the device body 10 or the storage device 13, the setting tool 103 may read the sample image data from the auxiliary storage device or the storage device 13.

The sample image captured in Step S40 is displayed in the image window 50 of the setting screen as illustrated in FIG. 5 (Step S41). As illustrated in FIG. 5, in the case that the object has a complicated shape, or that there is a small difference in color or luminance between the foreground (the portion to be extracted as the inspection area) and the background (other portions), it is difficult for the computer to automatically interpret and decide which inspection area is set. Therefore, in one or more embodiments of the present invention, the user instructs the computer in part of the area that should be the foreground in the sample image as an initial value.

(Designation of Foreground)

In one or more embodiments of the present invention, the foreground is designated by a manipulation to draw a graphic at any position on the sample image (hereinafter, the graphic is referred to as a foreground designating graphic). In the setting tool 103, a straight line drawing tool, a curved line drawing tool, a circle drawing tool, a rectangle drawing tool, a closed graphic drawing tool, and an eraser tool are prepared as a tool drawing the foreground designating graphic. The tool can be switched by selecting a corresponding icon of the tool button 52.

As illustrated in FIG. 6(*a*), the use of the straight line drawing tool can draw a straight line segment or a continuous straight line (polygonal line) on the sample image displayed in the image window 50. A line width can arbitrarily be changed. Because a manipulation used in CAD or drawing software (for example, click of a starting point and an ending point and a combination of starting point click and drag) may be used as the manipulation to input the straight line, the description is omitted. The same holds true for the input of other graphics. The use of the curved line drawing tool can draw a free curve, the Bezier curve, or the spline curve on the image as illustrated in FIG. 6(*b*). The use of the circle drawing tool can draw a circle or an ellipse as illustrated in FIG. 6(*c*). The use of the rectangle drawing tool can draw a square or a rectangle as illustrated in FIG. 6(*d*). The use of the closed graphic drawing tool can draw any closed graphic defined by the free curve as illustrated in FIG. 6(*e*). Although only one graphic is illustrated in FIGS. 6(*a*) to 6(*e*), plural graphics can be drawn. The foreground designating graphic may be used in the area inside the circle, the rectangle, or the closed graphic for the circle drawing tool, the rectangle drawing tool, and the closed graphic drawing tool. The foreground designating graphic may be used in the contour portion of the graphic like the straight line drawing tool and the curved line drawing tool. The eraser tool erases the drawn graphic. These tools are only by way of example, and any tool may be used as long as the partial area on the image can be designated by the closed graphic of the line or the polygon.

When the foreground designating graphic is drawn on the image using anyone of the tools (Step S42), the area partitioning button 53 can be selected. When the user presses the area partitioning button 53, the setting tool 103 acquires data of the pixel (referred to as a foreground designating pixel) in the portion in which the foreground designating graphic is overlapped from the sample image (Step S43). Based on colors of the foreground designating pixels, the setting tool 103 estimates a color distribution of the representative color of each of the foreground and the background by the following method.

(Estimation of Foreground and Background Color Distributions)

Figure 7A:
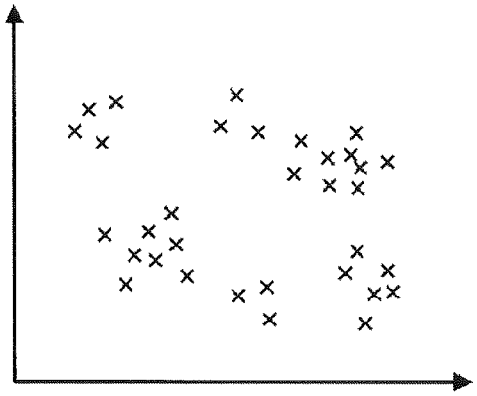
FIGS. 7(a)-7(c) are views illustrating processing of estimating a foreground color distribution and a background color distribution.

The setting tool 103 maps a value (color) of each pixel of the sample image in a predetermined color space (Step S44). The same color space (for example, an RGB color space) as a color channel of the sample image or other color spaces such as L*a*b* and XYZ can be used as the color space. Alternatively, a one-dimensional or two-dimensional color space may be used in order to simplify a calculation. FIG. 7(*a*) schematically illustrates an example of a mapping result (an example of the two-dimensional color space is illustrated for convenience). In FIG. 7(*a*), a mark "x" expresses the mapped pixel. Although several hundreds of thousands or several millions of pixels exist in the actual image, the mapping result is simplified in FIG. 7(*a*).

Figure 7B:
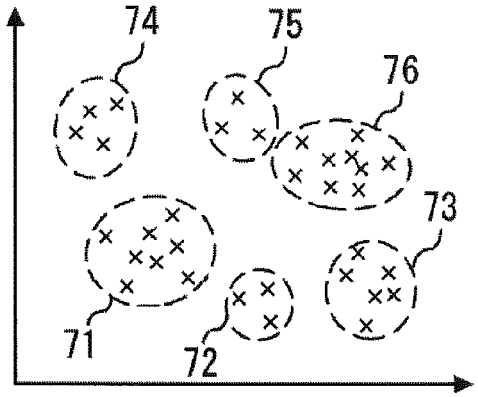

The setting tool 103 partitions the pixel group (that is, the color distribution of the sample image) mapped in the color space into plural clusters based on a color similarity (Step S45). Any algorithm such as GMM (Gaussian Mixture Model) clustering, a K-means method, a mean-shift method, and an infinite mixture directory distribution may be used as a clustering algorithm. Desirably the GMM clustering is used in one or more embodiments of the present invention. Because a GMM is used to calculate a likelihood in an optimum solution search of a latter part, advantageously a calculation result of the GMM clustering can directly be used in the optimum solution search. The number of clusters (the number of partitions) may dynamically be decided, or set by the user. FIG. 7(b) schematically illustrates an example in which the pixel group is partitioned into six clusters 71 to 76 as an example of a clustering result.

Figure 7C:
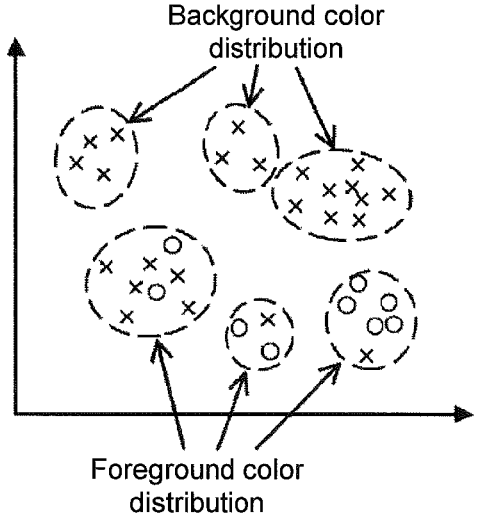

Then the setting tool 103 evaluates magnitude of a relationship between each of the six clusters 71 to 76 and the foreground designating pixel acquired in Step S43 (Step S46). Specifically, the setting tool 103 counts the foreground designating pixel included in each cluster, and calculates a score expressing the magnitude of the relationship with the foreground designating pixel based on a count result. In FIG. 7(c), a mark "o" expresses the foreground designating pixel. As can be seen from FIG. 7(c), the clusters 71, 72, and 73 include the foreground designating pixels, and the remaining clusters 74, 75, and 76 do not include the foreground designating pixels. In one or more embodiments of the present invention, a result in which the foreground designating pixel is counted one by one (that is, the total number of foreground designating pixels in the cluster) is used as the score. In this case, the cluster 73 has the score "5", the clusters 71 and 72 have the score "2", and the clusters 74, 75, and 76 have the score "0". Therefore, an evaluation result in FIG. 7(c) shows that the cluster 73 has the largest relationship with the foreground designating pixel while the clusters 74, 75, and 76 have the smallest relationship.

The method for calculating an index (score) expressing the magnitude of the relationship is not limited to the above example. For example, the setting tool 103 may count the foreground designating pixel while providing a weight corresponding to a position of the foreground designating pixel. For example, the weight of the pixel located in a central portion of the foreground designating graphic drawn by the user may be set larger than the weights of the surrounding pixels. This is because probably the user draws the graphic around a place considered to be the typical foreground portion. When the weights of the surrounding pixels are decreased, even if an end of the graphic projects from the foreground to hang over the background, there is an advantage that an influence on the score can be decreased. Alternatively, when plural foreground designating graphics are drawn, the weight of the pixel can be changed in each graphic. For example, it is conceivable that the weight of the graphic is increased toward the center, that the weight is increased with decreasing area of the graphic, or that the user designates the weight in each graphic. In the above description, the weight control is performed according to the position of the foreground designating pixel in the image. Alternatively, the weight control can also be performed according to the position of the foreground designating pixel in the color space (cluster). For example, the weight of the pixel located in the central portion of the cluster may be set larger than the weights of the pixels around the cluster. It is said that probably the cluster expresses the color of the foreground as the foreground designating pixels concentrate on the center of the cluster.

Then the setting tool 103 selects at least one cluster having the larger relationship with the foreground designating pixel from the six clusters 71 to 76, and decides the GMM in which the clusters are combined as a foreground color distribution (Step S47). In one or more embodiments of the present invention, all the clusters (that is, the clusters including at least one foreground designating pixel) having the scores of 1 or more are selected. In the example of FIG. 7(c), the GMM including the three clusters 71, 72, and 73 constitutes the foreground color distribution.

The way to select the cluster in Step S47 is not limited to the above example. For example, the threshold used to determine whether the relationship (score) with the foreground designating pixel is large may be set to a value larger than 1, or may be changed by the user. Desirably the threshold is dynamically changed according to the total number of foreground designating pixels or the distribution of the foreground designating pixel. Alternatively, the foreground color distribution is not decided by the comparison between the score and the threshold, but the clusters are sorted in the descending order of the relationship (score) with the foreground designating pixel, and a predetermined number of clusters in the descending order of the relationship with the foreground designating pixel may be selected as the foreground color distribution. The predetermined number of clusters can be set to any value of 1 or more, and may be changed by the user. Desirably the number of clusters selected as the foreground color distribution is dynamically changed according to the total number of foreground designating pixels or the number of partitions of the clusters.

Then the setting tool 103 selects at least one cluster having the smaller relationship with the foreground designating pixel from the six clusters 71 to 76, and decides the GMM in which the clusters are combined as a background color distribution (Step S48). In one or more embodiments of the present invention, all the clusters (that is, the clusters that do not include the foreground designating pixel at all) having the scores smaller than 1 are selected. In the example of FIG. 7(c), the GMM including the three clusters 74, 75, and 76 constitutes the background color distribution.

There are various variations of the way to select the cluster in Step S48. For example, the threshold used to determine whether the relationship (score) with the foreground designating pixel is small may be set to a value larger than 1, or may be changed by the user. Desirably the threshold is dynamically changed according to the total number of foreground designating pixels or the distribution of the foreground designating pixel. Alternatively, the foreground color distribution is not decided by the comparison between the score and the threshold, but the clusters are sorted in the ascending order of the relationship (score) with the foreground designating pixel, and a predetermined number of clusters in the ascending order of the relationship with the foreground designating pixel may be selected as the background color distribution. The predetermined number of clusters can be set to any value of 1 or more, and may be changed by the user. Desirably the number of clusters selected as the background color distribution is dynamically changed according to the total number of foreground designating pixels or the number of partitions of the clusters.

It is not necessary that all the clusters be selected as the foreground color distribution or the background color distribution. On the contrary, the cluster may be permitted to be selected as both the foreground color distribution and the background color distribution. This is because sometimes a similar color is included in both the foreground and the background. Desirably not only the relationship with the foreground designating pixel but also a distance (the distance in the color space) between the clusters are considered in Steps S47 and S48. For example, in the case that many cluster candidates of the background exist while a color difference is clear between the foreground and the background, the cluster distant from the cluster selected as the foreground color distribution may preferentially be selected as the cluster of the background. Alternatively, in order to exhaustively sample the color of the background, the cluster of the background may be selected such that the distance between the clusters is increased as much as possible. The same holds true for the cluster in the foreground.

(Area Partition)

Then the setting tool 103 performs the area partition (segmentation) on the sample image with the foreground color distribution and background color distribution estimated in Steps S44 to S48 as an initial condition (Step S49). Any algorithm can be used in the area partition. Desirably a contour-based algorithm searching an optimum boundary between the foreground and the background is used in the area partition. For example, algorithms such as graph cut and level set can suitably be used. In the algorithms, with respect to a candidate solution (candidate area) of the foreground area, the optimum solution of the foreground area is searched from plural candidate areas by estimating identity of the foreground (foreground likelihood) of the color of the pixel inside the candidate area and identity of the background (background likelihood) of the color of the pixel outside the candidate area. At this point, the identity of the foreground (foreground likelihood) of the color of each pixel can be calculated with the GMM that is of the foreground color distribution obtained in Step S47 as a probability density function. The identity of the background (background likelihood) of the color of each pixel can be calculated with the GMM that is of the background color distribution obtained in Step S48 as a probability density function. For example, for the use of the graph cut algorithm, an expression evaluating a total value of the foreground likelihood of each pixel inside the candidate area and the background likelihood of each pixel outside the candidate area may be used as a data term of an objective function. In this case, for example, an expression evaluating edge weights of four neighborhoods of each pixel can be used as a smoothing term. Because the graph cut algorithm is a well-known technique (for example, see NPL 1), the detailed description is omitted.

In the optimum solution search of Step S49, the candidate area of the foreground area may be set so as to include all the foreground designating pixels designated by the user. A search range can be narrowed with the positional information on the foreground designating pixel as the initial condition. Therefore, improved accuracy of the optimum solution search and shortened processing time can be expected.

The setting tool 103 performs overlay display of the foreground area (or a boundary between the foreground area and the background area), which is extracted as an area partition result in Step S49, on the sample image (Step S50). The user can check whether the desired area is extracted as the foreground by seeing the overlay display. When the user presses the enter button 54, the setting tool 103 decides the foreground area as the inspection area, generates inspection area definition information, and stores the inspection area definition information in the storage device 13 (Step S51).

In the case that the extracted foreground area is improper in Step S49, the processing may be started over from the image capture (Step S40) or the foreground designation (Step S42). Alternatively, a setting change dialog is displayed by pressing the setting change button 55, and a setting parameter associated with the foreground designation or the area partition can be adjusted. For example, the width of the line (brush) in drawing the foreground designating graphic, the number of partitioned clusters, the method for deciding each of the foreground and background color distributions, or the threshold can be adjusted as the setting parameter.

In the setting tool 103, because the user designates only a part of the foreground (the user need not to designate the background), the user intuitively and simply performs the manipulation. The foreground and background color distributions are estimated based on the color of the foreground designating pixel designated by the user, and the area partition is performed with the foreground and background color distributions as the condition, so that the area partition can be performed with higher accuracy compared with the method in which only the condition of the foreground is used. Because the prior knowledge such as the size of the object (foreground) need not to be provided, there is an advantage of excellent versatility. Particularly, in one or more embodiments of the present invention, the optimum solution of the foreground area is obtained by using the area partitioning algorithm such as graph cut and level set, so that the boundary between the foreground and the background can accurately be decided. Additionally, a balance between the improved search accuracy and the shortened processing time can be established because the search range is set so as to include the foreground designating pixel designated by the user.

The above embodiments are merely examples, and the scope of the present invention is not limited to the specific examples described above. For example, in one or more of the above embodiments, the color information on the image is used because the color image is assumed to be the sample image. In the case that the monochrome image is assumed to be the sample image, information on luminance (density) may be used instead of the color information. As described above, the area partitioning method according to one or more embodiments of the present invention can generally be used as not only the appearance inspection device but also an elemental technology for various pieces of digital image processing, computer vision, and machine vision.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

DESCRIPTION OF SYMBOLS

1 image inspection device
2 inspection object
10 device body
11 image sensor
12 display device
13 storage device
14 input device
101 inspection processor
102 inspection area extracting unit
103 setting tool
20 hinge portion
21 button portion
30 inspection area
31 inspection area image 50 image window
51 image capturing button
52 tool button
53 area partitioning button
54 enter button
55 setting change button
71-76 cluster

The invention claimed is:

1. An area partitioning method for partitioning an image into a foreground and a background, the method comprising:
a foreground designation step comprising causing a user to designate a part of pixels in an area in the image as a foreground designating pixel;
an estimation step comprising estimating a foreground color distribution and a background color distribution based on a color of the foreground designating pixel designated by the user; and
an area partition step comprising partitioning the image into a foreground area and a background area with the estimated foreground color distribution and the estimated background color distribution as a condition,
wherein the estimation step comprises:
dividing the color distribution of the image into a plurality of clusters;
selecting at least one cluster having a large relationship with the foreground designating pixel designated by the user in the plurality of clusters as the foreground color distribution; and
selecting at least one cluster having a small relationship with the foreground designating pixel as the background color distribution, and
wherein, in the area partition step, an optimum solution of the foreground area is obtained from a plurality of candidate areas that are of candidate solutions of the foreground area by evaluating identity of the foreground of a color of each pixel inside any of the plurality of candidate areas for the foreground color distribution and identity of the background of a color of each pixel outside the candidate area for the background color distribution with respect to the plurality of candidate areas.

2. The area partitioning method according to claim 1, wherein, in the area partition step, the plurality of candidate areas are set to include the foreground designating pixel designated by the user.

3. The area partitioning method according to claim 2, wherein, in the estimation step, magnitude of relationship with the foreground designating pixel is evaluated with respect to each of the plurality of cluster based on a count result of the foreground designating pixel included in the cluster.

4. The area partitioning method according to claim 2, wherein, in the estimation step, the cluster in which the relationship with the foreground designating pixel is greater than or equal to a threshold is selected as the foreground color distribution, or a predetermined number of clusters having the large relationship with the foreground designating pixel is selected in descending order as the foreground color distribution.

5. The area partitioning method according to claim 2, wherein, in the estimation step, the duster having no foreground designating pixels or the cluster in which the relationship with the foreground designating pixel is less than a threshold is selected as the background color distribution, or a predetermined number of clusters having the small relationship with the foreground designating pixel is selected in ascending order as the background color distribution.

6. The area partitioning method according to claim 1, wherein, in the estimation step, magnitude of relationship with the foreground designating pixel is evaluated with respect to each of the plurality of cluster based on a count result of the foreground designating pixel included in the cluster.

7. The area partitioning method according to claim 1, wherein, in the estimation step, the cluster in which the relationship with the foreground designating pixel is greater than or equal to a threshold is selected as the foreground color distribution, or a predetermined number of clusters having the large relationship with the foreground designating pixel is selected in descending order as the foreground color distribution.

8. The area partitioning method according to claim 1, wherein, in the estimation step, the cluster having no foreground designating pixels or the cluster in which the relationship with the foreground designating pixel is less than a threshold is selected as the background color distribution, or a predetermined number of clusters having the small relationship with the foreground designating pixel is selected in ascending order as the background color distribution.

9. The area partitioning method according to claim 1, wherein, in the estimation step, magnitude of relationship with the foreground designating pixel is evaluated with respect to each of the plurality of cluster based on a count result of the foreground designating pixel included in the cluster.

10. The area partitioning method according to claim 9, wherein, in the estimation step, the foreground designating pixel included in the cluster is counted while a weight is provided according to a position of the foreground designating pixel.

11. The area partitioning method according to claim 10, wherein, in the estimation step, the cluster in which the relationship with the foreground designating pixel is greater than or equal to a threshold is selected as the foreground color distribution, or a predetermined number of clusters having the large relationship with the foreground designating pixel is selected in descending order as the foreground color distribution.

12. The area partitioning method according to claim 10, wherein,
in the foreground designation step, a plurality of pixels is designated as the foreground designating pixel by a manipulation to draw a graphic on the image displayed on a display device, and
in the estimation step, a weight of a pixel located in a central portion of the drawn graphic out of the plurality of pixels is set larger than a weight of other pixel in the drawn graphic.

13. The area partitioning method according to claim 10, wherein,
a plurality of foreground designating pixels are included in one cluster, and
in the estimation step, a weight of each pixel of the plurality of foreground designating pixels is set according to the position of the pixel in the cluster.

14. The area partitioning method according to claim 13, wherein,
in the estimation step, a weight of a pixel located in a central portion of the cluster is set larger than a weight of other pixel in the cluster.

15. The area partitioning method according to claim 9, wherein, in the estimation step, the cluster in which the relationship with the foreground designating pixel is greater than or equal to a threshold is selected as the foreground color distribution, or a predetermined number of clusters having the large relationship with the foreground designating pixel is selected in descending order as the foreground color distribution.

16. The area partitioning method according to claim 9, wherein, in the estimation step, the cluster having no foreground designating pixels or the cluster in which the relationship with the foreground designating pixel is less than a threshold is selected as the background color distribution, or a predetermined number of clusters having the small relationship with the foreground designating pixel is selected in ascending order as the background color distribution.

17. The area partitioning method according to claim 1, wherein, in the estimation step, the cluster in which the relationship with the foreground designating pixel is greater than or equal to a threshold is selected as the foreground color distribution, or a predetermined number of clusters having the large relationship with the foreground designating pixel is selected in descending order as the foreground color distribution.

18. The area partitioning method according to claim 1, wherein, in the estimation step, the cluster having no foreground designating pixels or the cluster in which the relationship with the foreground designating pixel is less than a threshold is selected as the background color distribution, or a predetermined number of clusters having the small relationship with the foreground designating pixel is selected in ascending order as the background color distribution.

19. The area partitioning method according to claim 1, where, in the foreground step, the foreground designating pixel is designated by a manipulation to draw a graphic on the image displayed on a display device.

20. The area partitioning method according to claim 19, wherein the graphic is a straight line, a curve, a circle, an ellipse, a polygon, or a closed graphic.

21. A program stored on a non-transitory computer-readable medium that causes a computer to perform an area partitioning method for partitioning an image into a foreground and a background, comprising:
   a foreground designation step comprising causing a user to designate a part of pixels in an area in the image as a foreground designating pixel;
   an estimation step comprising estimating a foreground color distribution and a background color distribution based on a color of the foreground designating pixel designated by the user; and
   an area partition step comprising partitioning the image into a foreground area and a background area with the estimated foreground color distribution and the estimated background color distribution as a condition,
   wherein the estimation step comprises:
      dividing the color distribution of the image into a plurality of clusters;
      selecting at least one cluster having a large relationship with the foreground designating pixel designated by the user in the plurality of clusters as the foreground color distribution, and
      selecting at least one cluster having a small relationship with the foreground designating pixel as the background color distribution,
      wherein in the area partition step, an optimum solution of the foreground area is obtained from a plurality of candidate areas that are of candidate solutions of the foreground area by evaluating identity of the foreground of a color of each pixel inside any of the plurality of candidate areas for the foreground color distribution and identity of the background of a color of each pixel outside the candidate area for the background color distribution with respect to the plurality of candidate areas.

22. The program according to claim 21, wherein,
in the estimation step, magnitude of relationship with the foreground designating pixel is evaluated with respect to each of the plurality of cluster based on a count result of the foreground designating pixel included in the cluster.

23. The program according to claim 22, wherein,
in the estimation step, the foreground designating pixel included in the cluster is counted while a weight is provided according to a position of the foreground designating pixel.

24. The program according to claim 23, wherein,
in the foreground designation step, a plurality of pixels is designated as the foreground designating pixel by a manipulation to draw a graphic on the image displayed on a display device, and
in the estimation step, a weight of a pixel located in a central portion of the drawn graphic out of the plurality of pixels is set larger than a weight of other pixel in the drawn graphic.

25. The program according to claim 23, wherein,
a plurality of foreground designating pixels are included in one cluster, and
in the estimation step, a weight of each pixel of the plurality of foreground designating pixels is set according to the position of the pixel in the cluster.

26. The program according to claim 25, wherein,
in the estimation step, a weight of a pixel located in a central portion of the cluster is set larger than a weight of other pixel in the cluster.

* * * * *